United States Patent [19]
Rode

[11] 3,724,976
[45] Apr. 3, 1973

[54] FLUID DISTRIBUTOR FOR USE IN EXTRUDING FOAMED POLYMERIC MATERIALS

[75] Inventor: D. John Rode, Coraopolis, Pa.

[73] Assignee: Sinclair-Koppers Company, Pittsburgh, Pa.

[22] Filed: Dec. 1, 1970

[21] Appl. No.: 94,000

[52] U.S. Cl............425/72, 425/DIG. 817, 425/404, 425/467
[51] Int. Cl. .............................................B29d 23/04
[58] Field of Search .........18/14 A, 14 S, 14 H, 14 R, 18/14 G, 12 TT, 1 FZ, 8 QM; 264/48, 95, 237, 348; 239/505, 515, 521; 425/4, 72, 378, 404, 467, DIG. 817

[56] References Cited

UNITED STATES PATENTS

| | | | |
|---|---|---|---|
| 3,462,085 | 8/1969 | Nugarus | 239/515 |
| 3,170,011 | 2/1965 | Cheney et al. | 18/14 A X |
| 3,061,876 | 11/1962 | Lloyd et al. | 18/145 X |
| 3,064,905 | 11/1962 | Bonner | 18/145 X |
| 2,943,798 | 7/1960 | Rienks | 239/505 X |
| 2,570,828 | 10/1951 | Martin | 239/515 X |
| 3,364,524 | 1/1968 | Hsia | 425/404 |
| 2,461,630 | 2/1949 | Cozzo | 425/378 X |
| 3,560,600 | 2/1971 | Gliniecki | 425/4 X |
| 3,583,034 | 6/1971 | Colombo | 425/4 X |

Primary Examiner—J. Spencer Overholser
Assistant Examiner—David S. Safran
Attorney—Fred C. Trenor, Oscar B. Brumback and Olin E. Williams

[57] ABSTRACT

A distributor for directing a fluid onto the inside surface of a tubular extrudate of foamed polymeric material as the extrudate emerges from an annular die orifice of a conventional extruder to form a skin of unfoamed polymeric material thereon comprises a first member that is adjacent to and in coaxial alignment with the annular die orifice and a second member that is adjustably connected to the first member for axial movement therealong. Portions of the first and second members define an opening through which the fluid passes onto the inside surface of the tubular extrudate. Means for introducing the fluid from a source of supply to the opening is provided. The opening has impeding means disposed therein to create a fluid back pressure whereby an even pressure and an even flow of fluid is directed against the inside surface of the tubular extrudate.

5 Claims, 8 Drawing Figures

PATENTED APR 3 1973 3,724,976

INVENTOR.
D. JOHN RODE

BY Fred C. Trenor, II
Attorney 3,724,976

FLUID DISTRIBUTOR FOR USE IN EXTRUDING FOAMED POLYMERIC MATERIALS

BACKGROUND OF THE INVENTION

1. Field of the Invention

This invention relates to an extrusion apparatus for making foamed polymeric films, and more particularly, to a device for making foamed polymeric films that have smooth surfaces.

Foamed polymeric film or sheet such as, for example, foamed polystyrene, is useful as insulating material or useful in forming containers suitable for food packaging and the like. Conveniently, the foamed film or sheet is made by heat plastifying in a conventional extruder, expandable polystyrene polymer compositions such as are described in U.S. Pat. Nos. 2,941,964 and 3,089,857, and in extruding such compositions through an annular die orifice whereby a tubular extrudate is formed. The expandable polystyrene composition generally contains an agent system comprised of volatile organic hydrocarbons in combination with adjuncts such as, for example, sodium bicarbonate and citric acid which together evolve gases when the thermoplastic polymer is heated to its softening point. As the heated polystyrene composition passes through the annular die orifice of the extruder into the atmosphere the gases therein expand the polystyrene composition into a foamed film having a cellular structure.

Acceptable films of the foamed polystyrene composition may be produced using conventional extrusion orifices, but one or both surfaces of the foamed film has a tendency to be rough and pitted. Consequently, the film has a dull, unsightly appearance which restricts its commercial usage as a packaging material.

2. Description of the Prior Art

Heretofore, the surfaces of the extrudate of expandable polystyrene compositions have been chilled by various means as the extrudate emerges from the die orifice of the extruder to make smooth surfaces. Such chilling is done before any substantial expansion or foaming of the expandable polystyrene composition is commenced, as described, for example, in U.S. Pat. Nos. 3,042,972, 3,011,217 and 3,311,681. In U.S. Pat. No. 3,042,972 the extruded film is immediately immersed and quenched in a water bath after the film leaves the die orifice. In U.S. Pat. No. 3,011,217 the extruded film is immediately contacted by chilled nip rolls after the film leaves the die orifice; and, in U.S. Pat. No. 3,311,681 the extruded film is chilled by a stream of gas that impinges the surface of the foamed film immediately after the film leaves the die orifice. Accordingly, a nonporous, tough skin is formed on the extruded film so that the film comprises a substantially unfoamed skin near the surface and a substantially foamed core in the center.

The more convenient method of quench chilling the surfaces of the extruded film is to impinge the same with a gas. Devices for directing the gas against the surfaces, either the inside surface or the outside surface, or both, include such devices as a ring having a plurality of ports disposed in its circumference by which streams of gas are impinged upon the surface of the extruded film, or a device, as illustrated in U.S. Pat. No. 3,311,681, comprising two members that are coaxially arranged to define a circumferential slit through which the gas flows to impinge the inside surface of the extruded film. The disadvantage of such devices is that a nonuniform flow of gas at variable pressures impinges upon the extruded film. Accordingly, the surface of the extruded film has a nonuniform appearance and a nonuniform thickness.

Quite surprisingly, I have developed a new and improved fluid distributor which directs a uniform flow of fluid at a uniform pressure onto the extruded film as it emerges from the annular die so that the surface of the extruded film has a uniform appearance and thickness.

SUMMARY OF THE INVENTION

A fluid distributor for directing a fluid onto the inside surface of a tubular extrudate of foamed polymeric resin as it emerges from an annular die orifice of a conventional extruder has two coaxially arranged, spaced-apart members which are positioned coaxially adjacent to the annular die orifice. Portions of the spaced-apart members define an opening through which the fluid passes. The members are adjustably connected to each other for axial movement in respect of each other to change the width of the opening. Means for introducing the fluid into the opening is provided. Impeding means are situated in the opening for creating a back pressure on the fluid to produce an evenly distributed flow of fluid at an even pressure from the opening to the inside surface of the extrudate.

GENERAL DESCRIPTION OF THE DRAWINGS

DETAILED DESCRIPTION

Figure 1:
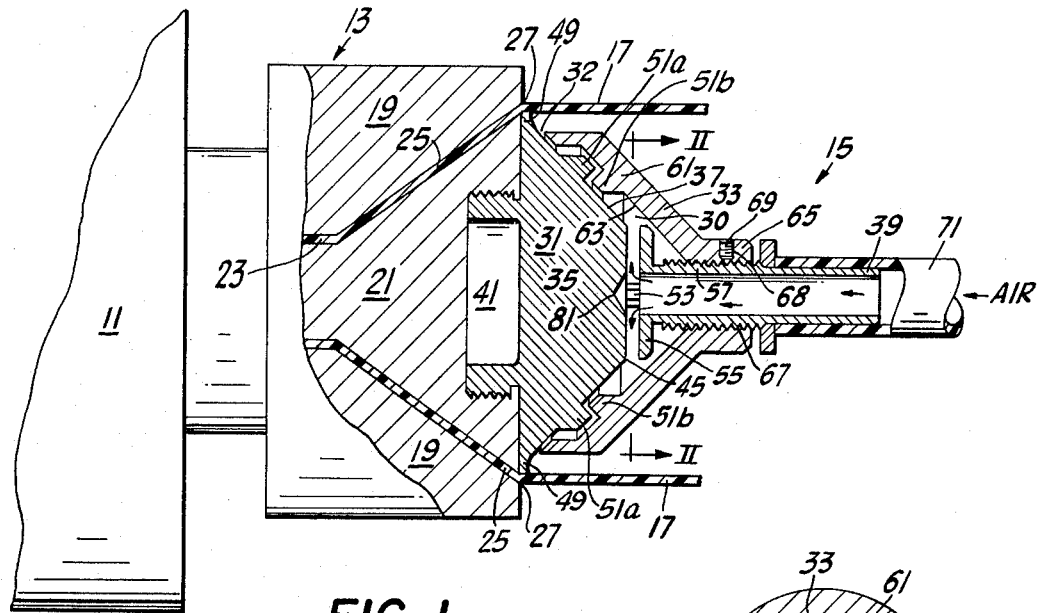
FIG. 1 illustrates a partial cross sectional view of the fluid distributor of this invention.

The device of FIG. 1 includes an extruder 11, a die, generally indicated at 13, and the novel fluid distributor of the invention, generally indicated at 15.

The extruder 11 has a screw (not shown) for heating and advancing a plastic material 17 through die 13. In FIG. 1 the die 13 comprises a body portion 19 and a mandrel 21 which defines an annular channel 23 and a frusto-conical channel 25. The plastic material 17 flows from extruder 11 into channel 23 and into the frusto-conical channel 25 and emerges from die lip 27 into the atmosphere at which point the expansion of the foamable thermoplastic material commences.

In accordance with the invention, the fluid distributor 15 in FIG. 1 comprises two coaxially arranged members 31 and 33. The first member 31 has a body portion 35 providing an external frusto-conical surface 37 and a sleeve portion 39 that is integral with the body portion 35 and that extends axially away from body portion 35. Body portion 35 has a threaded kunckle 41 for threading the first member 31 into the center of the mandrel 21 of the die 13 as illustrated in FIG. 1. The frusto-conical surface 37 of the body portion 35 starts at an outside diameter that is substantially equal to the inside diameter of the die orifice, and as indicated in FIG. 1, terminates at a smaller diameter indicated at 45. It will be observed in FIG. 1 that the frusto-conical surface 37 has arcuate portions 49 which are curved toward the plastic material 17 such that the fluid traveling over the frusto-conical surface 37 impinges the plastic material 17 in a substantially perpendicular direction as illustrated in FIG. 1.

Body portion 35 includes an impeding means or a baffle 51a extending from its frusto-conical surface 37 and completely surrounding the circumference thereof. The impeding means 51a stands in a substantially perpendicular direction from the frusto-conical surface 37; however, the particular direction is not critical.

Figure 2:
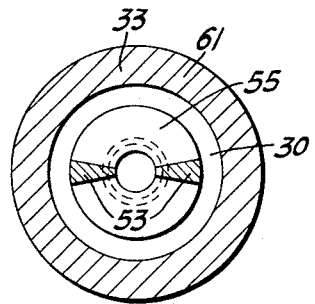
FIG. 2 is a cross sectional view of the fluid distributor of FIG. 1 taken at lines II—II.

Sleeve portion 39 extending axially away from the body portion 35 is connected to the body portion by two ribs 53 as illustrated in FIGS. 1 and 2. The sleeve portion 39 includes a radially extending flange 55 which has the same diameter as the small diameter of the body portion 35 of the first member. The sleeve portion is externally threaded at 57 as illustrated in FIG. 1 for receiving the second member 33.

The second member 33 has a body portion 61 providing an internal inverted frusto-conical surface 63 for matching the frusto-conical surface 37 of the first member 31. Coextensive with the body portion 61 is a collar 65 having internal threads 67 for mounting the second member 33 onto the sleeve portion 39 of the first member 31. The collar 65 has a tap 68 into which a set screw 69 or the like may be imposed to prevent movement of the first member 31 in respect to the second member 33. Body portion 61 includes an impeding means or a baffle 51b extending from the inverted frusto-conical surface 63 of the second member 33. As illustrated in FIG. 1, impeding means 51b extends circumferentially around the inverted frusto-conical surface 63. The impeding means 51b is arranged closer to the extruder than the impeding means 51a of the first member 31; however, they could be reversed in accordance with the invention.

A flexible hose 71 or the like is attached to the sleeve 39 of the first member 31 as illustrated in FIG. 1. The hose 71 is connected to a source of fluid such as, for example, a turbo-blower or the like (not shown) which provides air or the like to be applied against the plastic material 17.

The inverted frusto-conical surface 63 of the second member 33 and the frusto-conical surface 37 of the first member 31 define a frusto-conical channel 30 that terminates in annular opening 32 of a circumferential slit. The width of channel 30 is adjusted conveniently by rotating the second member 33 on sleeve portion 39 either toward or away from one another. When the proper or desired gap is achieved set screw 69 is impressed against sleeve portion 39 to hold the two members 31 and 33 in a fixed relationship to one another.

As an optional feature of the device of FIG. 1 the body portion 35 of the first member 31 has a frusto-conical impression 81 disposed in the axial center of the member as illustrated in FIG. 1. This facilitates the movement of air through the sleeve 39 into the frusto-conical channel 30.

In operation air or fluid enters the first member 31 through the hose 71 and passes into sleeve 39 as shown by the arrows in FIG. 1. The frusto-conical impression 81 forces the air radially away from the center of the first member; flange 55 directs the flow of air into the frusto-conical channel 30 as illustrated by the arrows of FIG. 1. The fluid passes around impeding means 51a and b and emerges from the members following the arcuate surface 49 of the first member 31 to impinge against the plastic material 17 as it emerges from the die orifice 27. The frusto-conical channel 30 directs the fluid into contact with the inside surface of the plastic material 17 as close to the die lips 27 as possible so that the fluid contacts the plastic material while it is still in a heated, deformable state and before full expansion of the cells has taken place. Consequently, the individual cells that are adjacent to the impinged surface do not completely expand and are therefore smaller and more rigid than the cells remote from the impinged surface. Accordingly the impinged surface will be smooth being comprised of unfoamed cells while the remainder of the plastic material will be cellular being comprised of fully expanded cells.

Figure 3:
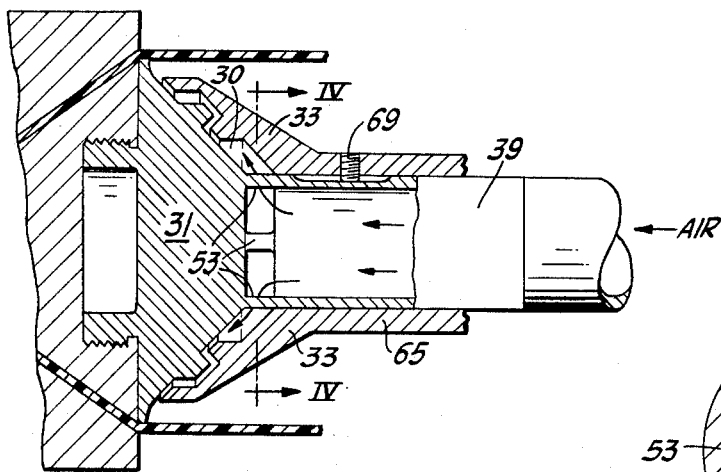
FIG. 3 is a vertical cross sectional view of another embodiment of the fluid distributor of this invention.
Figure 4:
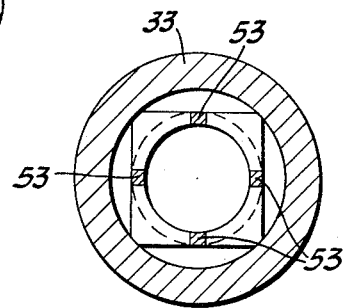
FIG. 4 is a cross sectional view of the fluid distributor of FIG. 3 taken at lines IV—IV.

FIGS. 3 and 4 illustrate another embodiment of the fluid distributor in accordance with the invention. The first member 31 is similar to the first member illustrated in FIGS. 1 and 2 except that four ribs 53 connect the sleeve portion 39 to the body portion 35, and the sleeve portion 39 is not externally threaded as the sleeve portion illustrated in FIG. 1. The second member 33 is similar to the second member illustrated in FIGS. 1 and 2 except that the collar 65 is not threaded but has an inside diameter equal to the outside diameter of the sleeve portion 39 so that the first and second members 31 and 33 may be slid coaxially in respect of each other to change the width of frusto-conical channel 30.

Figure 5:
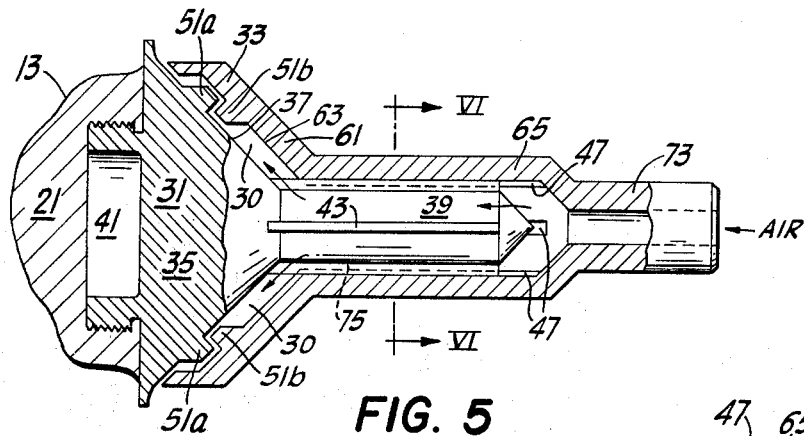
FIG. 5 is a vertical cross sectional view of another embodiment of the fluid distributor of my invention.
Figure 6:
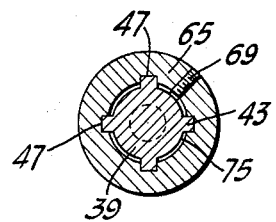
FIG. 6 is a cross sectional view of the fluid distributor of FIG. 5 taken at lines VI—VI.

FIGS. 5 and 6 illustrate another embodiment of the fluid distributor in accordance with the invention. The first member 31 has a body portion 35 providing an external frusto-conical surface 37 and a stem portion 39 that is integral with the body portion and that extends axially therefrom. Body portion 35 has a threaded knuckle 41 for securing the first member 31 into the center of the mandrel 21 of the die 13 as shown in FIG. 5. The stem portion 39 has four axially aligned keys 43 that extend the entire length of the stem portion as illustrated in FIGS. 5 and 6; however, two diametrically opposed keys would suffice in accordance with the invention.

The second member 33 has a body portion 61 providing an internal inverted frusto-conical surface 63 for matching the frusto-conical surface 37 of the first member 31. Coextensive with the body portion 61 is a collar 65 for mounting the second member 33 onto the stem portion 39 of the first member 31 and a nipple 73 to which a flexible hose or the like may be attached. The inside surface of the collar 65 has four axially aligned keyways 47 that extend the entire length thereof and that receive the keys 43 of the stem portion 39. Consequently, an annular channel 75 and a frusto-conical channel 30 is provided between the first and second members 31 and 33 so that the fluid may pass from its source through the channels 30 and 75 and around the impeding means 51a and b against the inside surface of the plastic material 17. Both members 31 and 33 shown in FIGS. 5 and 6 have impeding means 51a and b similar to those of FIG. 1.

Figure 7:
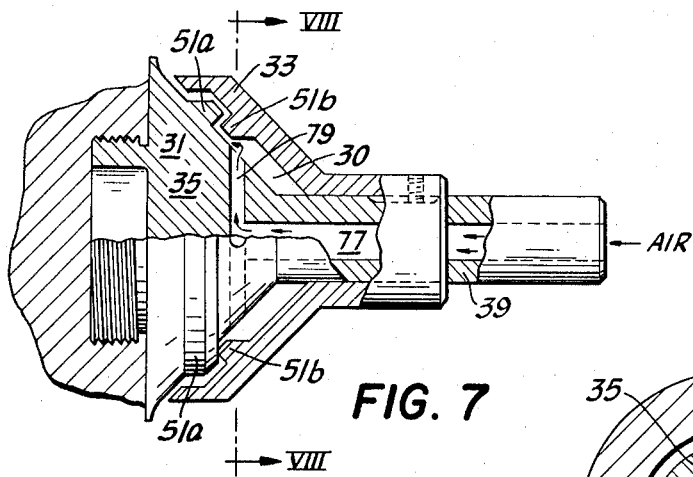
FIG. 7 is a vertical cross sectional view of another embodiment of the fluid distributor of my invention.
Figure 8:
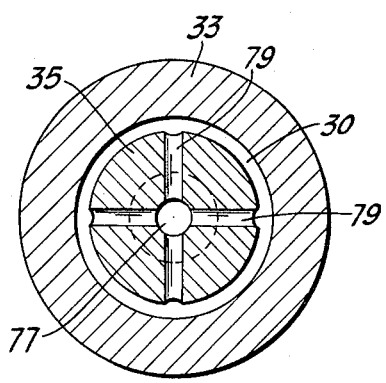
FIG. 8 is a cross sectional view of the fluid distributor of FIG. 7 taken at lines VIII—VIII.

FIGS. 7 and 8 illustrate another embodiment of the fluid distributor in accordance with the invention. The first member 31 is similar to the first member illustrated in FIGS. 1 and 2 except that the first member 31 has an axial bore 77 that extends entirely through the sleeve portion 39 into the body portion 35 of the first member and at least one second bore 79 passing through a diameter of the body portion 35 so that it is substantially perpendicular to the axial bore 77 and intersects the axial bore so that there is a communication through the sleeve into the frusto-conical channel 30 downstream from the impeding means 51a and b.

The second member 33 is identical to the second member of FIG. 3. As shown in FIGS. 7 and 8 there are two second bores 79 passing through a diameter of the body portion 35 of the first member; however, one axial bore would suffice.

In all the embodiments of the present invention the first and second members may be axially moved in respect of each other to change the width of the opening defined by both members. By changing the width of the opening the flow of fluid onto the plastic material may be altered. The desired flow of fluid onto the plastic material will vary with the circumstances and may be determined by those skilled in the art by suitable experimentation to meet their requirements.

The fluid distributor of the present invention is designed so that a more uniform flow of fluid at a uniform pressure may be impinged against the surface of the plastic material. This uniform flow at uniform pressures is achieved by the impeding means being disposed within the opening defined by portions of both members. Consequently expandable polymeric materials may be extruded in conventional extruders whereby the films so extruded have more uniform appearing surfaces than heretofore known.

What is claimed is:

1. In an apparatus for forming tubular extrudate of foamed polymeric material having a skin of unfoamed polymeric material on the inside surface, the combination comprising:
    a. a die defining an annular orifice from which an extrudate emerges; and
    b. a fluid distributor for directing a fluid onto the inside surface of the extrudate comprising:
        1. first and second members, coaxially spaced apart and defining a frusto-conical opening through which said fluid passes and said members being adjustably connected to each other for axial movement in respect to each other to change the width of said opening;
        2. means for introducing said fluid into said opening; and
        3. impeding means in said opening for creating a back pressure on said fluid;
    said first member comprising:
        a. a first body portion secured to the die in axial alignment with and adjacent said annular orifice and having an external frusto-conical surface starting at a diameter that is substantially equal to the diameter of said die orifice and terminating at a smaller diameter; and
        b. a sleeve portion integral with said first body portion that extends axially away from said first body portion at the smaller diameter of said frusto-conical surface; and
    said second member comprising:
        a. a second body portion having an internal frusto-conical surface matching the frusto-conical surface of said first body portion; and
        b. a collar mounting said second member to said sleeve portion of said first member.

2. The combination of claim 1 wherein said sleeve has an axial bore extending therethrough and a plurality of apertures extending through the wall of said sleeve near the first body portion of said first member so that the bore of said sleeve communicates with said opening.

3. The combination of claim 1 wherein a first axial bore extends completely through said sleeve portion and into said first body portion of said first member, and at least one second bore, substantially perpendicular to said first bore, passing through said first body portion and intersecting said first bore so that said first bore communicates with said frusto-conical opening.

4. The combination of claim 1 wherein said sleeve has external threads and said collar has internal threads so that said members may be coaxially adjusted in respect of each other to alter the width of said frusto-conical opening.

5. The combination of claim 1 wherein the fluid distributor comprises
    a. one member comprising:
        1. a first body portion secured to the die in axial alignment with and adjacent said annular orifice and having an external frusto-conical surface starting at a diameter that is substantially equal to the diameter of said die orifice and terminating at a smaller diameter; and
        2. a stem portion integral with said first body portion that extends axially away from said first body portion at the smaller diameter of said frusto-conical surface; and
    b. the other member comprising:
        1. a second body portion having an internal frusto-conical surface matching the frusto-conical surface of said first body portion; and
        2. a collar mounting said other member to said stem portion of said one member and having at least two axially extending keyways; and
    c. said stem portion having at least two axially aligned keys for engagement into said keyways so that at least two chambers for the passage of fluid from a source to said frusto-conical opening is provided between said stem and said collar, and whereby said members may be axially adjusted to change the width of said frusto-conical opening.

* * * * *